(12) United States Patent
Osafune

(10) Patent No.: US 6,950,259 B2
(45) Date of Patent: Sep. 27, 2005

(54) DISK DRIVE WITH CONTROL OF READ AND WRITE GATE SIGNALS FOR READ AND WRITE OPERATION

(75) Inventor: Koji Osafune, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 350 days.

(21) Appl. No.: 10/095,037

(22) Filed: Mar. 12, 2002

(65) Prior Publication Data

US 2002/0131191 A1 Sep. 19, 2002

(30) Foreign Application Priority Data

Mar. 15, 2001 (JP) .................................... 2001-074174

(51) Int. Cl.$^7$ ............................................... G11B 5/09
(52) U.S. Cl. ...................................................... 360/51
(58) Field of Search .............................. 360/51, 50, 39, 360/48

(56) References Cited

U.S. PATENT DOCUMENTS 4,651,235 A    3/1987  Morita et al.
5,600,501 A  *  2/1997  Yamakoshi et al. ........... 360/51
5,796,534 A  *  8/1998  Yamamoto et al. ........... 360/48
6,577,462 B1 *  6/2003  Hamada et al. ............... 360/51
6,754,018 B2 *  6/2004  Takahashi .................... 360/53

FOREIGN PATENT DOCUMENTS

EP        0 920 007 A2    6/1999
JP        6-176486        6/1994
JP        11-3565         1/1999

* cited by examiner

Primary Examiner—David Hudspeth
Assistant Examiner—Daniell L. Negrón
(74) Attorney, Agent, or Firm—Pillsbury Winthrop Shaw Pittman LLP

(57) ABSTRACT

A disk drive to be used with the perpendicular magnetic recording method comprises a read/write gate generator that is adapted to regulate the timing of outputting a write gate signal and that of outputting a read gate signal. The generator regulates the output timings on the basis of the gap between the read head and the write head of the magnetic head unit of the disk drive and the data format on the disk. The generator has a DSP generator for generating a data sector pulse and delay circuits for regulating respectively the timing of the read gate signal and that of the write gate signal according to the data sector pulse.

13 Claims, 5 Drawing Sheets

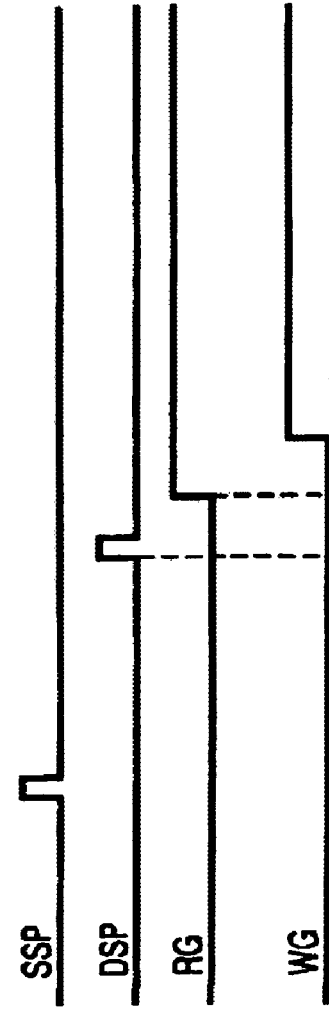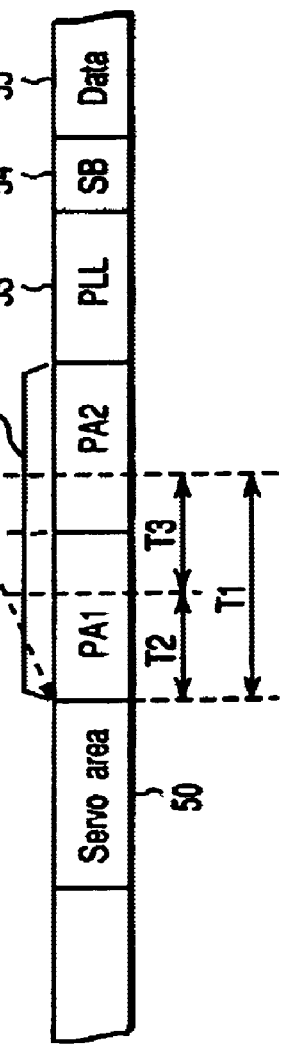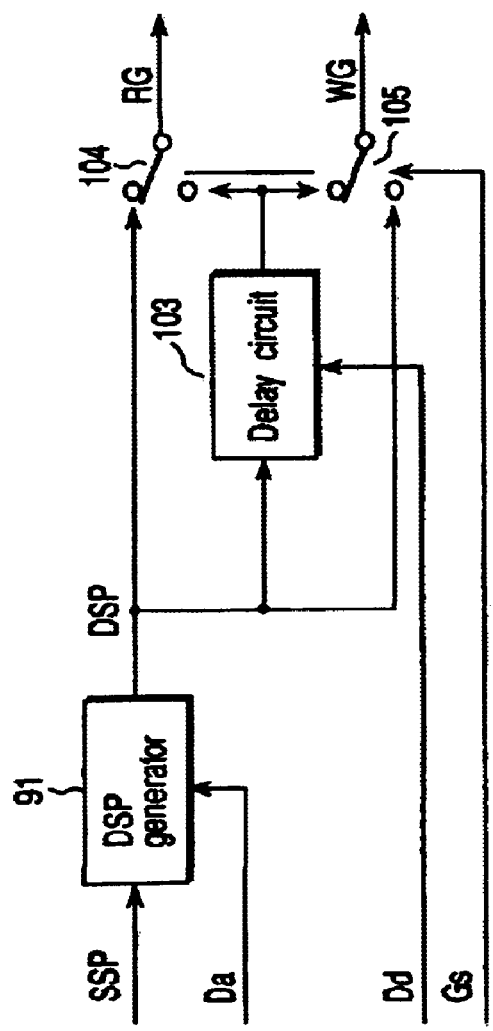

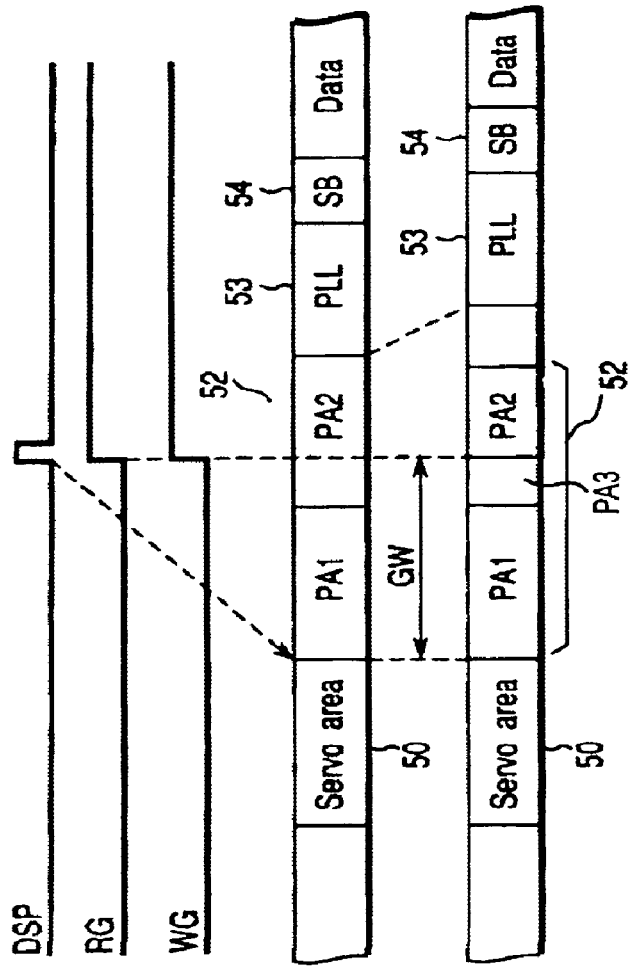
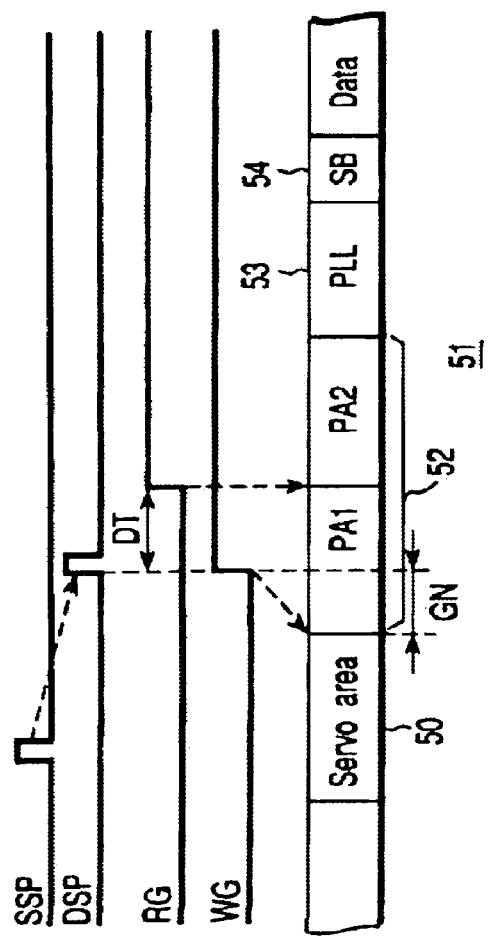

DISK DRIVE WITH CONTROL OF READ AND WRITE GATE SIGNALS FOR READ AND WRITE OPERATION

CROSS-REFERENCE TO RELATED APPLICATIONS

This application is based upon and claims the benefit of priority from the prior Japanese Patent Application No. 2001-074174, filed Mar. 15, 2001, the entire contents of which are incorporated herein by reference.

BACKGROUND OF THE INVENTION

1. Field of the Invention

This invention generally relates to the field of a disk drive to be used with the perpendicular magnetic recording method, and more particularly, to control of read/write gate signals for regulating the timing of a read/write operation.

2. Description of the Related Art

In recent years, the perpendicular magnetic recording method has been attracting attention as technique for overpassing the recording density limit of the conventional longitudinal magnetic recording method in the technological field of disk drives including hard disk drives. Perpendicular magnetic recording method can realize a high surface recording density because it provides a relatively high signal resolution and small signal amplitude attenuation for a high linear recording density.

As is the same basic structure of the longitudinal magnetic recording method, a magnetic head unit having a read head and a write head mounted separately on a slider is used in a disk drive that is adapted to the perpendicular magnetic recording method. The read head normally comprises a GMR (giant magnetoresistive) element, whereas the write head is typically an SPT (single pole type) head. When such a magnetic head is designed to be used with the perpendicular magnetic recording method, the read head and the write head are separated from each other by a large gap greater than its counterpart of the longitudinal magnetic recording method in the circumferential direction of the disk. More specifically, the gap separating the read head and the write head of a magnetic head unit to be used with the perpendicular magnetic recording method is about 7 to 8 $\mu$m. On the other hand, the gap separating the read head and the write head of a magnetic head unit to be used with the longitudinal magnetic recording method is about 3 to 4 $\mu$m.

With a disk drive using such a separate type magnetic head unit, the timing of reading operation of the read head and that of writing operation of the write head have to be regulated relative to each other. Now, this will be described in greater detail below.

FIG. 7 of the accompanying drawing is a schematic block diagram of a conventional disk drive, illustrating a principal part thereof. Referring to FIG. 7, the disk drive comprises a separate type magnetic head unit 2, a preamp circuit 7, a read/write (R/W) channel 8, a disk controller (HDC) 9 and a microprocessor (CPU) 10.

The preamp circuit 7 has a read amp for amplifying the read signal output from the read head of the magnetic head unit 2 and a write amp for converting the write data signal into a write electric signal. The R/W channel 8 is a signal processing IC adapted to process a read/write data signal (including a servo data signal) and has a function of generating a servo sector pulse SSP out of a servo data signal as will be described hereinafter.

The HDC 9 operates as interface for the drive and the host system (not shown) and has a read/write gate generator 90 for generating read/write signals (RG, WG). The CPU 10 is a main control unit for the drive and controls the read/write gate generator 90.

The disk provided in the disk drive has a number of data regions referred to as data tracks and arranged radially on the surface. Each data track has a data format as shown in FIG. 5B of the accompanying drawing. Referring to FIG. 5B, the data format provides servo areas 50 arranged circumferentially at regular intervals and data areas 51 each of which is arranged between two adjacent servo areas. A servo data signal is recorded in each servo area 50 in the manufacturing process of the drive by a dedicated device referred to as a servo track writer. The servo area 50 is a region which is prohibited the operation of recording data during the normal operation of reading and writing data. The servo data signal provides servo information that is used (by the CPU 10) to control the positioning of the magnetic head unit 2.

On the other hand, each data area 51 is divided into a number of data sectors where user data (DATA) are recorded on it. Additionally, note that the data area 51 has a length that is not necessarily equal to the length of a data sector multiplied by an integer. A data sector may be divided into two sectors with a servo area 50 interposed between them.

Each data sector has a gap 52, a PLL synchronizing signal (PLL) 53, a sync byte (SB) 54, a user data (DATA) 55, EC (error correction) related information 56 and a pad 57 as shown in FIG. 6.

Referring still to FIG. 6, gap 52 is a region for absorbing fluctuations in the rotational movement of the disk. The gap 52 is recorded by the write head during the operation of writing data in the data area 51. Then, a PLL synchronizing signal (PLL) 53 is recorded immediately after the recording of the gap 52. The PLL 53 provides a synchronizing signal pattern for synchronizing the read clock to be used for a read operation (data reproducing operation) with the data that is recorded there. Then, a synchronizing byte (sync byte SB) 54 for detecting the starting point of user data is recorded. Subsequently, user data (DATA) is recorded.

Referring now to FIG. 8C, a read operation is executed as the HDC 9 activates the read gate signal RG for the R/W channel 8. The read/write gate generator 90 comprises a data sector pulse (DSP) generator 91 and a delay circuit 92. The read/write generator 90 generates a read gate signal RG and a write gate signal WG by referring to the DSP generated by the DSP generator 91 as shown in FIG. 8B. The DSP generator 91 generates a data sector pulse (DSP) by referring to the servo sector pulse (SSP) output from the R/W channel 8 as shown in FIG. 8A. The servo sector pulse (SSP) is generated at the timing of the servo gate signal (SG) output from the HDC 9.

In the write operation, the write gate signal WG is activated by the data sector pulse (DSP) as shown in FIG. 8D. Immediately after the servo area 50, the data sector pulse (DSP) is generated with a delay equal to the time period corresponding to the gap (GN) between the read/write heads, starting from the timing of the end of the servo area 50 (see FIG. 8E). The delay is necessary because, when the end of the servo area 50 is detected by referring to the read head, the write head is still located within the servo area 50 and therefore the servo data signal recorded in the servo area 50 will be destroyed if any data is written at that time. The delay is provided to avoid this problem.

In the read operation, on the other hand, the read gate signal RG needs to be activated at the middle of the rotary movement fluctuations absorbing gap 52 (the boundary of the parts PA1 and PA2) (see FIG. 8C). Therefore, the delay circuit 92 activates the read gate signal RG at the timing obtained by a delay of a predetermined time period DT from the data sector pulse (DSP). The delay time DT is defined by the CPU 10. As a result, the read head can reliably read the PLL synchronizing signal (PLL) 53 if the rotary movement of the disk fluctuates in the read/write operation. Note that a PLL synchronizing signal is recorded in the rotary movement fluctuations absorbing gap 52. In other words, the PLL region 53 is an area for securing a necessary minimal PLL synchronizing signal.

With the longitudinal magnetic recording method, the gap separating the read/write heads is about 3 μm as pointed out earlier. If the disk rotates at a rate of 4,200 rpm±0.2%, the time period (GN) corresponding to the gap varies depending on the position of the head unit 2 on the disk. More specifically, the time period (GN) is about 0.32 μs on the outer periphery of the disk and about 0.64 μs on the inner periphery of the disk. Therefore, normally, the CPU 10 defines a delay time (GN) for each zone on the disk and gives it to the DSP generator 91. The zones of the disk are produced by dividing the total number of tracks on the disk by a given number.

On the other hand, each rotary movement fluctuations absorbing gap 52 (PA1 and PA2) has a constant length regardless of the position on the disk. If the accuracy of rotary movement is ±0.2%, the time period corresponding to the rotary movement fluctuations absorbing gap 52 is about 1.27 μs. Then, the delay time DT of the read gate signal RG is "(1.27/2−0.32)=0.315 μs" on the outer periphery and substantially equal to 0 on the inner periphery.

As pointed out above, the magnetic head unit 2 of the perpendicular magnetic recording method has a gap between the read/write heads greater than its counterpart of the longitudinal magnetic recording method. Therefore, the timing of generating the data sector pulse (DSP) needs to be relatively delayed as shown in FIG. 9A. If the delay time is reduced to nil, the timing of activating the read gate signal RG the two parts (PA1 and PA2) of the rotary movement fluctuations absorbing gap 52 as shown in FIG. 9B. Under this condition, there may be cases where the PLL synchronizing signal is not properly read out from the PLL region 53 by the read head at the timing of activating the read gate signal RG because of fluctuations in the rotary movement of the disk.

Therefore, it is necessary to absorb fluctuations in the rotary movement of the disk by increasing the region of the rotary movement fluctuations absorbing gap 52 (by PA3 for the PA1) as shown in FIG. 9E. However, the efficiency of the data format is reduced as the region of the rotary movement fluctuations absorbing gap 52 that is not the data recording region of the disk increases.

Now, how the efficiency of the data format is reduced will be described more specifically.

Assume that the gap separating the read/write heads is 8 μm and the disk is driven to rotate at a rate of 4,200 rpm±0.2%. The time period (GN) that corresponds to the gap varies depending on the position of the head unit 2. To be accurate, the time period is about 0.86 μs on the outer periphery and about 1.71 μs on the inner periphery of the disk.

As for the length of the pairs of rotary movement fluctuations absorbing gap 52, the PA1 needs to be increased by a part (PA3) that corresponds to 0.225 μs on the outer periphery and 1.075 μs on the inner periphery, provided that the accuracy of rotary movement is ±0.2% and the delay time DT of the read gate signal is 0. These time periods correspond respectively to 8.4 bytes and 20.1 bytes in terms of a disk drive having a transfer rate of 300 Mbps. In other words, the rotary movement fluctuations absorbing gap 52 has a length equal to 1.3% to 3.2% of a data sector on the disk. Therefore, the efficiency of the data format is reduced by these percentage figures.

Disk drives adapted to delay the operation of recording the data to be written by a time period corresponding to the gap (distance) separating the read/write heads so that the read head may properly reproduce the recorded data (see, inter alia, Jpn. Pat. Appln. KOKAI Publication No. 6-176486 and U.S. Pat. No. 5,600,501). However, the problem of reduced efficiency of the data format cannot be resolved simply by delaying the operation of recording the data to be written on the disk.

BRIEF SUMMARY OF THE INVENTION

Therefore, the object of the present invention is to provide a disk drive that is to be used with the perpendicular magnetic recording method can properly read a PLL signal on a disk and avoid the problem of efficiency reduction of the data format.

In accordance with an aspect of the present invention, there is provided a disk drive including facilities to control a read gate signal and a write gate signal in accordance with the space between the read head and the write head of a magnetic head unit and the data format on the disk in the disk drive.

The disk drive comprises:

a disk operating as recording medium and adapted to record data signals by perpendicular magnetic recording;

a magnetic head unit having a write head for writing a data signal onto and a read head for reading a data signal from the disk;

a gate generator for generating a write gate signal for determining the timing of the write operation of the write head and a read gate signal for determining the timing of the read operation of the read head;

the gate generator being adapted to regulate the timing of outputting the write gate signal and that of outputting the read gate signal on the basis of the gap between the write head and the read head in the circumferential direction of the disk and the data format on the disk; and a read/write device for executing the write operation at the timing of outputting the write gate signal and the read operation at the timing of outputting the read gate signal.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIGS. 3A through 3D are timing charts illustrating the operation of the read/write gate generator of FIG. 1;

FIG. 3E is a schematic illustration of the data format, illustrating the operation of the read/write gate generator of FIG. 1;

FIG. 4 is a schematic block diagram of an embodiment obtained by modifying the embodiment of FIG. 1;

FIGS. 8A through 8D are timing charts illustrating the operation of the read/write gate generator of FIG. 7;

FIG. 8E is a schematic illustration of a data format that can be used for the operation of the known disk drive of FIG. 7;

FIGS. 9A through 9C are timing charts also illustrating the operation of the read/write gate generator of FIG. 7; and FIGS. 9D and 9E are schematic illustrations of data formats that can be used for the operation of the known disk drive of FIG. 7.

DETAILED DESCRIPTION OF THE INVENTION

Now, the present invention will be described in greater detail by referring to the accompanying drawing that illustrates a preferred embodiment of the invention.
(Configuration of Disk Drive)

Figure 2:
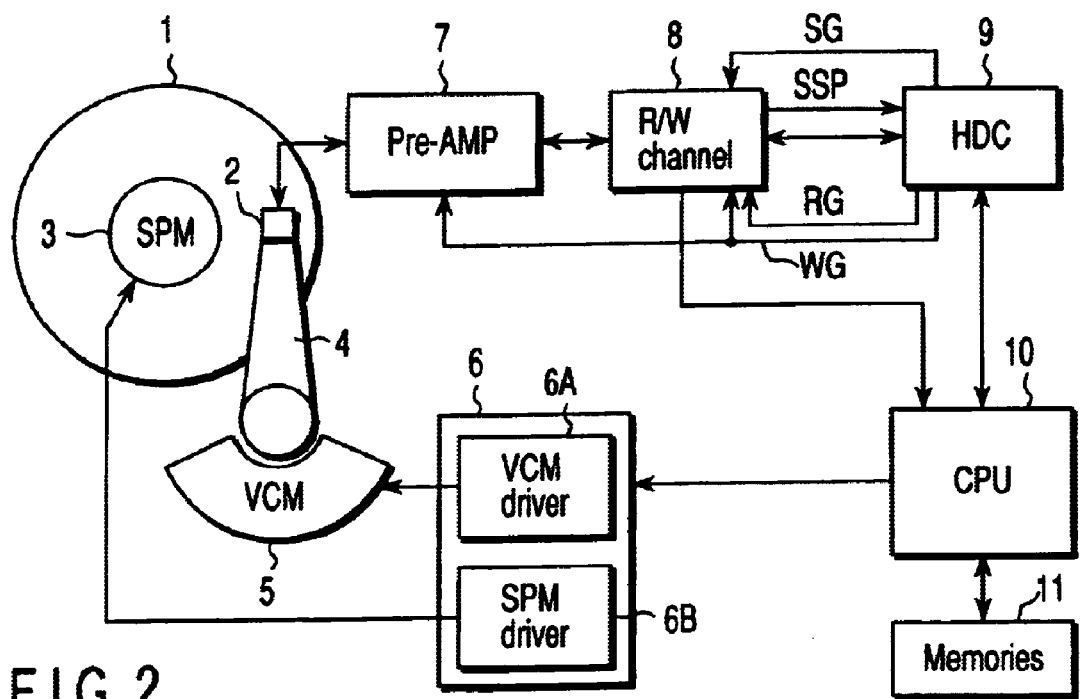
FIG. 2 is a schematic block diagram of the embodiment of disk drive of FIG. 1, illustrating a principal part thereof.
Figures 5A, 5B, 5C, 6:
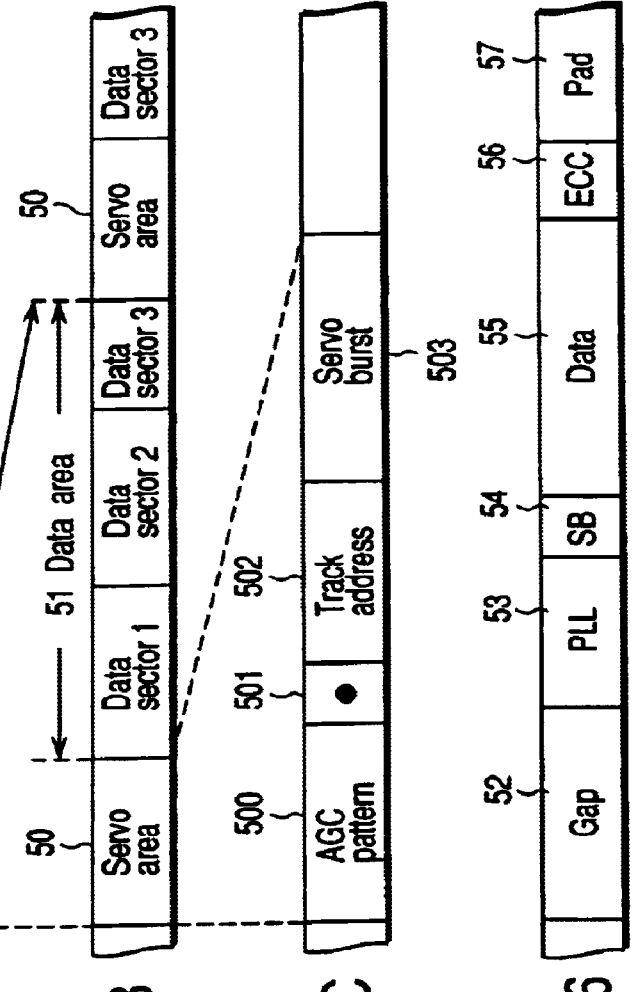
FIGS. 5A through 5C are schematic illustrations of the configuration of a disk to be used with the modified embodiment of FIG. 4.
FIG. 6 is a schematic illustration of the data format on the disk of FIGS. 5A through 5C.
Figure 7:
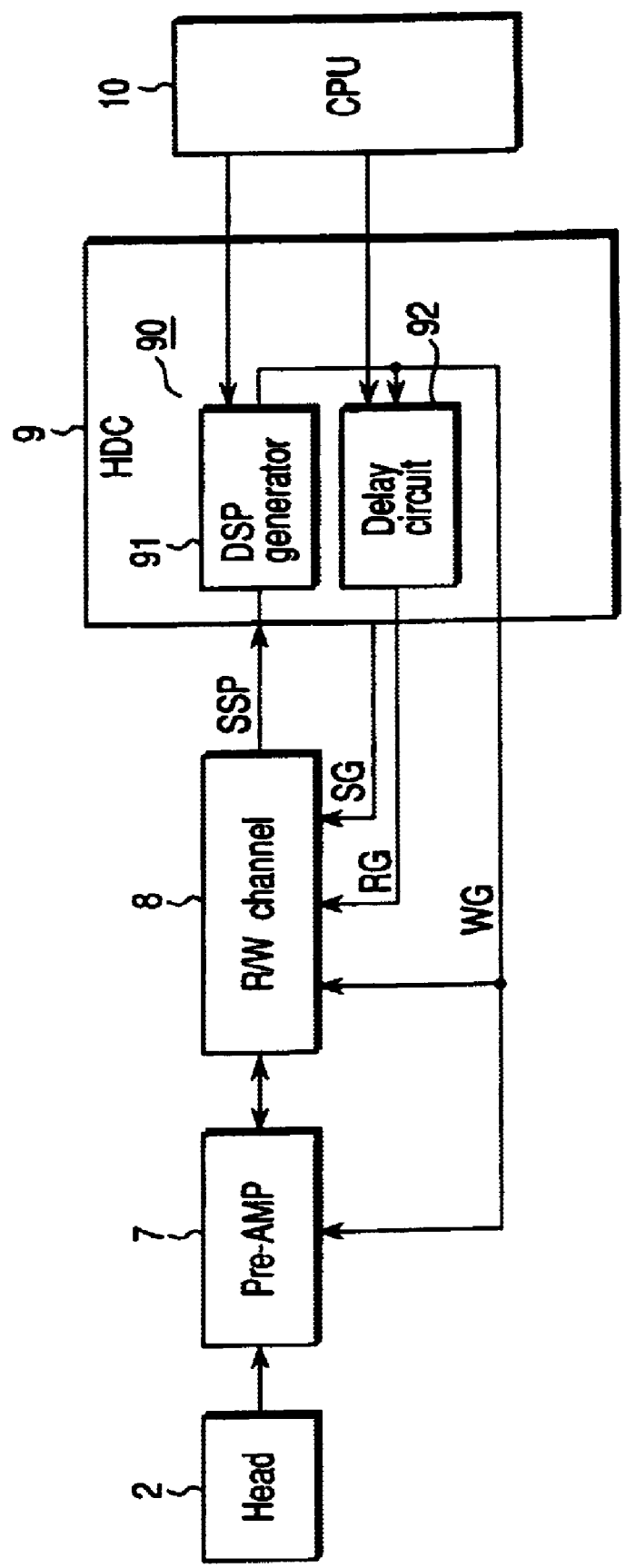
FIG. 7 is a schematic block diagram of a known disk drive, illustrating a principal part thereof.

This embodiment of disk drive according to the invention is adapted to be used with the perpendicular magnetic recording method. Referring to FIG. 2, the disk drive comprises a disk 1 operating as data recording medium and a magnetic head unit 2 for reading data from and writing data onto the disk 1. The disk 1 is driven by a spindle motor (SPM) 3. As shown in FIG. 5A, a number of tracks (TR0 through TRn) are formed concentrically on the disk 1.

The magnetic head unit 2 includes a read head that is normally a GMR element and a write head that is normally a SPT head, the read head and the write head being separated from each other and mounted on a slider. As pointed out earlier, the read/write heads of the magnetic head unit 2 are circumferentially separated from each other by a gap (distance) of about 7 to 8 $\mu$m. Therefore, the gap is larger than that of a magnetic head unit adapted to be used with the longitudinal magnetic recording method.

The magnetic head 2 is mounted on an actuator 4. The actuator 4 moves the head unit 2 of the disk in a radial direction of the disk 1 by the drive force of a voice coil motor (VCM) 5. The VCM 5 is the object of control (plant) of a head positioning control system (servo system) in a narrow sense of the word and fed with a drive current by means of a VCM driver 6A that is included in motor driver IC 6. The motor driver IC 6 includes the VCM driver 6A and an SPM driver 6B for feeding the SPM 3 with a drive current and is controlled by CPU 10.

Besides the above described head disk assembly, the disk drive comprises a circuit system having a preamp circuit 7, a R/W channel 8, a disk controller (HDC) 9, a CPU 10 and memories 11.

The preamp circuit 7 includes a read amp for amplifying the read signal output from the read head and a write amp for converting a write data signal into a write current signal. The R/W channel 8 is a signal processing IC for processing read/write signals (including servo signals) and also has a function of generating a servo sector pulse SSP out of the servo data signal read out from by the read head.

The HDC 9 operates as interface of the disk drive and the host system (not shown) and includes a read/write gate generator 100 for generating read/write gate signals (RG, WG). The CPU 10 is the main control unit of the disk drive and controls the read/write generator 100. The memories 11 includes a flash EEPROM, a RAM and a ROM and is adapted to store various programs and data necessary for the operation of the CPU 10.
(Configuration of Read/Write Gate Generator)

Figure 1:
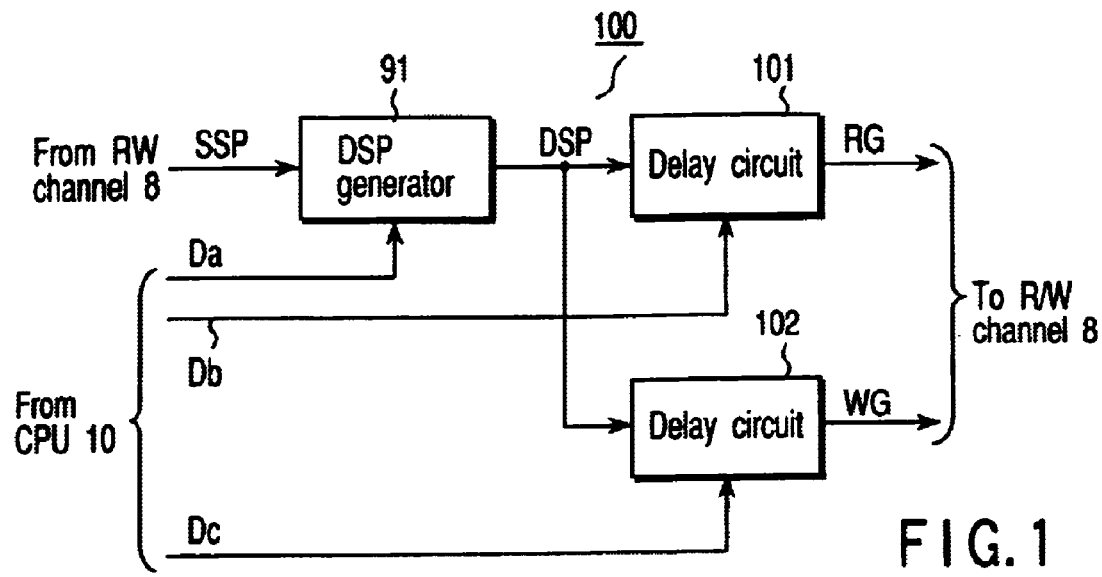
FIG. 1 is a schematic block diagram of the read/write gate generator of an embodiment of disk drive according to the invention, illustrating a principal part thereof.

As shown in FIG. 1, the HDC 9 comprises a DSP generator 91 and a read/write gate generator 100 having delay circuits 101, 102. The respective delay times Da through Dc of the DSP generator 91 and the delay circuits 101, 102 are defined by the CPU 10. The DSP generator 91 generates a data sector pulse (DSP) by referring to the servo sector pulse (SSP) output from the R/W channel 8.

The R/W channel 8 detects a servo sector mark 501 from the read signal output from the read head when the servo gate signal (SG) output from the HDC 9 becomes active. A servo sector mark 501 is a signal to be used for detecting a servo area 50 as it is contained in the servo area 50. In addition to the mark 501, an AGC pattern 500 and a track address code 502 and a servo burst signal that are servo data in a narrow sense of the word are also recorded in the servo area 50. The R/W channel 8 generates a servo sector pulse (SSP) in response to the detection of a servo sector mark 501 and transmits it to the HDC 9 (notification of detection of a servo sector mark).

The delay circuits 101, 102 respectively output a read gate signal RG and a write gate signal WG to the R/W channel 8 at respective timings that are determined according to the delays Db, Dc given by the CPU 10 (see FIGS. 1 and 2). The R/W channel 8 carries out a read operation (of processing a read signal) at the timing of the read gate signal RG and a write operation (of processing a write signal) at the timing of the write gate signal WG.
(Data Format)

As shown in FIG. 5A, a number of tracks (TR0 through TRn) are concentrically formed on the disk 1. Each track has servo areas 50 arranged circumferentially at regular intervals and data areas 51 each of which is arranged between two adjacent servo areas as shown in FIG. 5B. Each data area 51 is divided into a number of data sectors for recording user data (DATA). Note that the data area 51 has a length that is not necessarily equal to the length of a data sector multiplied by an integer. As shown in FIG. 5B, a data sector (sector No. 3 in FIG. 5B) may be divided into two sectors with a servo area 50 interposed between them.

As shown in FIG. 5C, the servo area 50 stores a servo sector mark 501, an AGC pattern 500, a track address code 502 and a servo burst signal 503 that are recorded on it.

Additionally, each data sector has a gap 52, a PLL synchronizing signal (PLL) 53, a sync byte (SB) 54, a user data (DATA) 55, ECC (error correction) related information 56 and a pad 57 also recorded on it.

The gap 52 is a region for absorbing fluctuations in the rotation movement of the disk 1. The gap 52 is recorded by the write head during the operation of writing data in the data area 51. Then, a PLL synchronizing signal (PLL) 53 is recorded immediately after the recording of the gap 52. The PLL 53 provides a synchronizing signal pattern for synchronizing the read clock to be used for a read operation (data reproducing operation) with the data that is recorded there. Then, a sync byte (SB) 54 for detecting the starting point of user data (DATA) is recorded. Subsequently, user data (DATA) is recorded. The pad 57 is a region for a write path delay.

(Operation of Generating Read/Write Gate Signals)

The disk drive executes a read operation in the data area 51 when HDC 9 activates the read gate signal RG for the R/W channel 8. In the read operation, the R/W channel 8 processes the read signal read out by the read head and reproduces (decodes) the user data. At this time, it is necessary to reliably read the PLL synchronizing signal from the PLL region 53 in order to obtain a synchronizing pulse necessary for the read operation. On the other hand, the disk drive executes a write operation in the data area 51 when the HDC 9 activates the write gate signal WG for the R/W channel 8. In the write operation, the R/W channel 8 processes a write data signal and transmits it to the preamp circuit 7 in order to supply a write signal to the write head. At this time, the timing of the data writing operation needs to be so regulated that it may not carried out in the servo area 51.

Now, the operation of generating read/write gate signals of the embodiment will be described by referring to FIGS. 3A through 3E.

As shown in FIG. 3A, the R/W channel 8 outputs a servo sector pulse (SSP) to the HDC 9 in response to the detection of a servo area 50 (and a servo mark 501). Then, the DSP generator 91 generates a data sector pulse (DSP) that indicates the starting point of the data sector as shown in FIG. 3B. At this time, the DSP generator 91 generates the data sector pulse (DSP) at the timing corresponding to a predetermined delay time (T2) from the end of the servo area 50 (and hence the head of the data sector) according to the delay (Da) defined by the CPU 10 (see FIG. 3E).

Furthermore, the DSP generator 91 generates a plurality of data sector pulses (DSPs) at regular time intervals starting from the first data sector pulse (DSP), the number of data sector pulses corresponding to the number of data sectors. In short, the DSP generator 91 generates a data sector pulse (DSP) at the timing of the leading region of each of the data sectors contained in the data area 51 on the basis of the three parameters defined by the CPU 10. The three parameters includes the time (T2) from the end of the servo area 50 (the head of the data sector) to the first data sector pulse (DSP), the length of each data sector and the number of data sectors corresponding to a single servo area 50.

Then, in the write operation, the read/write gate generator 100 generates a write gate signal WG at the timing corresponding to a predetermined delay time (T3) from the DSP according to the delay (Dc) defined by the CPU 10 for the delay circuit 102 (see FIGS. 3D and 3E). The time from the end of the servo area 50 (the head of the data sector) to the generation of the write gate signal WG is expressed by "T1=T2+T3", which is a delay time corresponding to the gap between the read head and the write head (the distance of about 7 to 8 μm).

On the other hand, in the read operation, the read/write gate generator 100 generates a read gate signal RG at the timing corresponding to a predetermined delay time from the data sector pulse (DSP) according to the delay (Db) defined by the CPU 10 for the delay circuit 101. The timing of generating the read gate signal RG is so selected that it comes at the middle of the gap 52 (the boundary of the parts PA1 and PA2) (see FIG. 3E).

As described above, the read/write gate generator 100 of this embodiment generates a write gate signal WG at the timing corresponding to a predetermined delay time (T3) from the data sector pulse (DSP) in the write operation. In other words, the generator 100 generates a write gate signal WG at the timing corresponding to the delay time (T1), which by turn corresponds to the gap (distance of about 7 to 8 μm) between the read head and the write head, from the end of the servo area 50. At this time, the DSP generator 91 generates a data sector pulse (DSP) at the timing corresponding to the delay time (T2) that is shorter than the delay time (T1) corresponding to the gap (distance of about 7 to 8 μm) between the read head and the write head.

Therefore, the timing of the start of the write operation corresponds to an area that by turn corresponds to the gap 52 as shown in FIG. 3E so that any error of writing data in the servo area 50 is reliably avoided. In the read operation, on the other hand, the generator 100 generates a read gate signal RG at the timing corresponding to a predetermined delay time from the data sector pulse (DSP). Therefore, the read operation starts from the middle of the gap 52 (the boundary of PA1 and PA2) as shown in FIG. 3E. Thus, the PLL synchronizing signal can be read properly from the PLL region 53 without expanding the area of the gap 52. As a result, it is possible to avoid any reduction in the efficiency of the data format that may arise when the area of the gap 52 is increased.

As specific example, when the time (T2) from the end of the servo area 50 to the generation of the data sector pulse (DSP) is 0.4 μs, preferably the delay time of the read gate signal RG is made equal to 0.235 μs. It is also preferable to make the delay time (T3) of the write gate signal WG to be equal to 0.46 μs at the outer periphery and equal to 1.31 μs at the inner periphery of the disk 1. In short, preferably, delays (Da, Db, Dc) for the read/write gate generator 100 are regulated at each zone on the disk 1 under the control of the CPU 10 during the read/write operation.

Thus, with this embodiment of the invention, when a read gate signal and a write gate signal are generated by referring to the generation of a data sector pulse (DSP), the delay times selected by referring to the DSP are so regulated that the read gate signal always precedes the write gate signal. Additionally, the write gate signal is generated with a delay of a predetermined time period after the generation of the DSP. In the read operation, the delay of a predetermined time period as defined by referring to the DSP is regulated for the generation of the read gate signal. In short, the read head can properly read a PLL synchronizing signal from a PLL area without expanding the area of the related gap on the data format. In the write operation, the write head can effectively avoid erroneously writing data in the servo area.

(Modified Embodiment)

FIG. 4 is a schematic block diagram of the read/write gate generator of an embodiment obtained by modifying the embodiment of FIG. 1.

Referring to FIG. 4, the read/write gate generator comprises a DSP generator 91, a delay circuit 103 and switches 104, 105. The switches 104, 105 are controlled by the CPU 10.

The above of FIG. 4 of this modified embodiment operates in such a way that the delay circuit 103 is used only for generating a write gate signal WG when the delay time (T1) corresponding to the gap (distance of about 7 to 8 μm) between the read head and the write head and the time (T4) corresponding to the gap 52 satisfies the requirement of "T1>T4/2". The time "T4/2" corresponds to the middle of the gap 52 (the boundary of PA1 and PA2).

More specifically, the read/write gate generator activates a read gate signal RG at the timing substantially equal to the timing of generation of a DSP and generates a write gate signal WG at the timing that corresponds to the delay time of the delay circuit 103 by using the switches 104, 105 under the control of the CPU 10. At this time, the DSP generator 91 generates the DSP at the timing corresponding to the middle of the gap 52 according to the delay (Da) defined by the CPU 10. When the above requirement is not met and hence the relationships of "T1<T4/2" and "T1>T4/2" hold true respectively at the outer periphery and the inner periphery of the disk 1, the delay circuit 103 is used for the operation of generating a read gate signal RG at the outer periphery by means of the switches 104, 105 under the control of the CPU 10. On the other hand, the delay circuit 103 is used for the operation of generating a write gate signal WG at the inner periphery as in the case of the above embodiment.

Thus, in this modified embodiment, a same delay circuit 103 is used commonly for generating read/write gate signals under the control of the CPU 10. In other words, this modified embodiment has a reduced circuit configuration if compared with the above embodiment.

As described above in detail, the magnetic head unit of a disk drive according to the invention that is adapted to be used with the perpendicular magnetic recording method and having the read head and the write head separated from each other by a relatively large gap can regulate the generation of read/write gate signals for respectively determining the timings of read/write operations. Then, it is always possible to properly read the corresponding PLL synchronizing signal that is needed for the read operation and avoid any increase of the area of the gaps on the disk and hence any reduction of the efficiency of the data format. Thus, a disk drive comprising such a magnetic head unit can be effectively used to realize a high recording density particularly by means of the perpendicular magnetic recording method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A disk drive comprising:

a disk adapted for recording data signals by perpendicular magnetic recording, and having a data format including a servo area and a gap region for absorbing rotation fluctuations and for recording a PLL synchronizing signal;

a magnetic head unit having a write head for writing data signals onto the disk and a read head for reading data signals from the disk;

a read/write device which executes a write operation for writing the data signals in accordance with the data format on the disk using the write head at a timing of outputting a write gate signal and a read operation for reading the data signals using the read head at a timing of outputting a read gate signal; and a gate generator constructed and arranged to generate the write gate signal and the read gate signal, wherein the gate generator determines the timing of outputting the write gate signal in the write operation in accordance with a separating gap between the write head and the read head in a peripheral direction of the disk and the data format, and that of outputting the read gate signal in the read operation, the read gate signal being output at the timing corresponding to the gap region and before the timing of the write gate signal, the write operation including an operation to record the PLL synchronizing signal in the gap region.

2. The disk drive according to claim 1, wherein a plurality of tracks, each having a plurality of data sectors, are formed on the disk and each of the data sectors is provided with the data format and includes the gap region, a PLL region and a user data recording regions, further comprising:

a data sector pulse generator for generating a data sector pulse to be used for detecting the head of each data sector, wherein one data sector pulse is associated with each data sector, and wherein the gate generator is adapted to generate the read gate signal at the timing corresponding to the gap region by referring to the timing of generation of the data sector pulse.

3. The disk drive according to claim 2, wherein the gate generator is adapted to generate the read gate signal at the timing substantially corresponding to the middle of the gap region by referring to the timing of generation of the data sector pulse and the write gate signal at the timing as defined in terms of the distance from the head of the gap region on the basis of the separating gap.

4. The disk drive according to claim 2, wherein the data sector pulse generator is adapted to generate a data sector pulse at the timing of a delay time shorter than the delay time corresponding to the separating gap, the timing being defined in terms of the distance from the head of the data sector.

5. The disk drive according to claim 1, wherein a plurality of tracks, each having a plurality of servo areas and a plurality of data sectors, are formed on the disk and each of the servo areas is arranged between two adjacent data sectors, each of the data sectors being provided with the data format and includes the gap region, a PLL region and a user data recording region, the disk drive further comprising:

a data sector pulse generator adapted to generate a data sector pulse for detecting the head of each data sector by referring to the servo sector pulse from the servo area;

the gate generator being adapted to generate the read gate signal at the timing corresponding to the gap region by referring to the timing of generation of the data sector pulse and the write gate signal at the timing coming behind the timing of generation of the read gate signal with a delay time corresponding to the separating gap as defined from the end of the servo area.

6. The disk drive according to claim 1, wherein a plurality of tracks, each having a plurality of data sectors, are formed concentrically on the disk and each of the tracks is divided into zones defined in a radial direction for control purposes;

the gate generator being adapted to regulate the timing of outputting the write gate signal and that of outputting the read gate signal for each zone.

7. The disk drive according to claim 2, wherein a plurality of tracks are formed concentrically on the disk and each of the tracks is divided into zones defined in a radial direction for control purposes;

the gate generator being adapted to regulate the timing of outputting the write gate signal and that of outputting the read gate signal for each zone.

8. The disk drive according to claim 2, wherein the data sector pulse generator and the gate generator are included in a disk controller operating as interface of the disk drive and an external system.

9. A method of generating a read gate signal for a read operation and a write gate signal for a write operation in a disk drive by perpendicular magnetic recording, disk drive having a disk, a read head and a write head, the method comprising:

generating the write gate signal in the write operation in accordance with a separating gap between the write head and the read head in a peripheral direction of the disk and data format including a servo area and a gap region on the disk, and the read gate signal in the read operation, wherein data format of the disk includes a servo area, and a nap region for absorbing rotation fluctuations and for recording a PLL synchronizing signal, and the read gate signal is output at the timing corresponding to the gap region and before the timing of the write gate signal; and executing the write operation at the timing of the output of the write gate signal and the read operation at the timing of the output of the read gate signal, the write operation including a operation to record the PLL synchronizing signal in the gap region.

10. The method according to claim 9, further comprising:

generating a data sector pulse for detecting the head of each data sector formed on the disk, the data sector pulse being one pulse to one data sector; and generating the read gate signal by referring to the timing of generation the data sector pulse and the write gate signal at the timing coming behind the read gate signal and defined on the basis of the separating gap.

11. The method according to claim 9, further comprising:

generating a data sector pulse for detecting the head of each data sector formed on the disk, wherein each data sector is provided with the data format and includes the gap region, a PLL region and a user data recording region thereof; and generating the read gate signal at the timing corresponding to the gap region of each data sector by referring to the timing of generation the data sector pulse and the write gate signal at the timing coming behind the read gate signal and defined on the basis of the separating gap from the head of data sector.

12. The method according to claim 9, further comprising:

generating a servo sector pulse out of the read signal read out from a servo area formed on the disk by means of the read head;

generating a data sector pulse for detecting the head of each data sector by referring to the servo sector pulse, wherein each data sector is provided with the data format and includes the gap region, a PLL region and a user data recording region thereof;

generating the read gate signal at the timing corresponding to the gap region of each data sector by referring to the timing of generation of the data sector pulse; and generating the write gate signal at the timing coming behind the read gate signal and defined on the basis of the separating gap from the head of data sector.

13. The disk drive according to claim 2, wherein the data sector pulse generator includes a generator for generating a servo sector pulse in accordance with a servo sector mark detected from the servo area, and generates the data sector pulse to be used for detecting the head of each data sector in accordance with the servo sector pulse, the data sector pulse being one pulse to one data sector.

* * * * *